United States Patent
Caldeira et al.

(10) Patent No.: US 8,606,437 B2
(45) Date of Patent: Dec. 10, 2013

(54) FLIGHT CONTROL SYSTEM MODE AND METHOD PROVIDING AIRCRAFT SPEED CONTROL THROUGH THE USAGE OF MOMENTARY ON-OFF CONTROL

(75) Inventors: Fabricio Reis Caldeira, Sao Jose dos Campos (BR); Marcos Vinicius Campos, Sao Jose dos Campos (BR); Reneu Luiz Andrioli, Jr., Sao Jose dos Campos (BR); Wagner de Oliveira Carvalho, Sao Jose dos Campos (BR); Dagfinn Gangsaas, Sao Jose dos Campos (BR); Eduardo Camelier, Sao Jose dos Campos (BR); Daniel Siqueira, Sao Jose dos Campos (BR); Lucas Rubiano, Sao Jose dos Campos (BR)

(73) Assignee: Embraer S.A., Sao Jose dos Campos (BR)

( * ) Notice: Subject to any disclaimer, the term of this patent is extended or adjusted under 35 U.S.C. 154(b) by 184 days.

(21) Appl. No.: 13/304,979

(22) Filed: Nov. 28, 2011

(65) Prior Publication Data

US 2013/0138274 A1 May 30, 2013

(51) Int. Cl.
*B64C 13/00* (2006.01)
(52) U.S. Cl.
USPC ............... 701/16; 701/3; 701/6; 244/75.1; 244/178; 244/181; 244/182; 244/183; 244/220; 244/221; 244/99.14
(58) Field of Classification Search
None
See application file for complete search history.

(56) References Cited

U.S. PATENT DOCUMENTS

| | | | | |
|---|---|---|---|---|
| 4,357,661 A * | 11/1982 | Lambregts et al. | ............ | 701/18 |
| 4,633,404 A * | 12/1986 | Greeson et al. | ............ | 701/3 |
| 5,036,469 A * | 7/1991 | Pelton | ............ | 701/16 |
| 5,478,031 A * | 12/1995 | Piche | ............ | 244/195 |
| 6,325,333 B1 * | 12/2001 | Najmabadi et al. | ............ | 244/181 |
| 6,332,105 B1 * | 12/2001 | Calise et al. | ............ | 701/3 |
| 2002/0158168 A1 * | 10/2002 | Greene | ............ | 244/186 |
| 2006/0253230 A1 * | 11/2006 | Fanciullo et al. | ............ | 701/3 |
| 2009/0171518 A1 * | 7/2009 | Yamane | ............ | 701/15 |
| 2010/0217460 A1 * | 8/2010 | Polati De Souza et al. | ... | 701/18 |
| 2011/0121140 A1 * | 5/2011 | Yamane et al. | ............ | 244/183 |
| 2011/0168851 A1 * | 7/2011 | Cherepinsky | ............ | 244/223 |
| 2012/0253561 A1 * | 10/2012 | Ellis et al. | ............ | 701/3 |

OTHER PUBLICATIONS

Airplane Flying Handbook, Second Edition, Federal Aviation Administration, Chapter 8—Approaches and Landings, and Chapter 11—Transition to Complex Airplanes, 2011, 55 pages.

* cited by examiner

*Primary Examiner* — Jonathan M Dager
(74) *Attorney, Agent, or Firm* — Nixon & Vanderhye P.C.

(57) ABSTRACT

A longitudinal control law is designed to optimize the flying qualities when aircraft is set to approach configuration, i.e. when the flap lever is set to the landing position and landing gears are locked down. Under such circumstances, the effort of trimming the aircraft speed can be extremely reduced by the usage of a momentary on-off switch or other control in the sidestick, instead of or in addition to a conventional trim up-down switch, making easier the task of airspeed selection by the pilot. This control law provides excellent handling qualities during approach and landing, with the benefit of not needing or using radio altimeter information in safety-critical applications.

17 Claims, 6 Drawing Sheets

FLIGHT CONTROL SYSTEM MODE AND METHOD PROVIDING AIRCRAFT SPEED CONTROL THROUGH THE USAGE OF MOMENTARY ON-OFF CONTROL

CROSS-REFERENCES TO RELATED APPLICATIONS

N/A

STATEMENT REGARDING FEDERALLY SPONSORED RESEARCH OR DEVELOPMENT

N/A

FIELD

The technology herein relates human-machine aircraft control user interfaces, and more particularly to a closed-loop speed control user interface system using a momentary on-off switch. Exemplary illustrative non-limiting implementations are systems, mechanisms and methods to be used in a flight vehicle equipped with a closed loop control law in the longitudinal axis.

BACKGROUND AND SUMMARY

The control interface between a pilot and the air control surfaces of an aircraft has received much attention over the history of aviation. The earliest control interfaces were very simple but required a great deal of pilot skill to operate. Modern "fly by wire" interfaces make use of a host of electronics to assist the pilot and make flight safer and more economical. In "fly by wire", the pilot interacts with an electronic user interface that then controls actuators at each aircraft control surface. Designers are constantly working to make the control user interface safer, easier to understand and operate, and more effective, efficient and reliable.

So-called "closed loop control" using a "control law" is commonly used to control the aircraft during flight. The use of feedback control laws to augment the elevator command in the pitch axis of an aircraft has been used since the latter half of 20th Century. In terms of modern aircraft, digital control laws are used to implement control laws that use a reference command based on pitch rate, load factor or a combination of thereof. Airspeed in conjunction with a load factor may also be considered as a reference command. In some cases, all three variables are considered as reference command, that is, the load factor, pitch rate and airspeed are considered.

Typically in the aeronautical industry, "fly-by-wire" aircraft that operates in closed-loop in the longitudinal axis maintain the aircraft flight path while the pilot manually moves (deflects) a sidestick controller to provide a load factor command for most of the flight phases. In this case, a longitudinal control law provides neutral static speed stability and auto-trim. This type of control law provides excellent handling qualities while in cruise but not necessarily during landing. More specifically, longitudinal control laws often do not provide suitable landing flare characteristics, and in particular speed stability during landing. Generally speaking, landing flare is initiated by increasing the aircraft's pitch attitude during landing just enough to reduce the sink rate to a desired amount (e.g., 100-200 feet per minute) when the landing gear is a certain distance (e.g., approximately 15 feet) above the runway surface. In most jet airplanes, this will require a pitch attitude increase of a certain amount (e.g., 1° to 3°). The thrust ideally is smoothly reduced to idle as the flare progresses, but speed stability is especially important during this critical landing phase. See e.g., The Airplane Flying Handbook (U.S. Federal Aviation Administration 2011).

The standard solution in industry has been the utilization of radio altimeter sensor. The information of height above ground level is used to change the control law to a configuration with positive speed stability near to the ground. Thus, it has been the standard in industry that the configuration change in the longitudinal control law for the flare (that is, when the aircraft altitude reaches the flare altitude) is based on radio altimeter information. Particularly, a control law with neutral speed stability and auto-trim provides a control law with positive speed stability, when flare height is reached. However, this sort of solution has occasionally presented in-service events such as early flare activation during the approach due to erroneous height indication. Radio altimeter information can be corrupted by external and internal causes, such as water flow dirt or ice accretion on antennas, degraded connectors, reflectivity variations in terrain and contaminated runways. Another setback related to the usage of radio altimeter in critical flight controls application is the dependency on redundant sensors to guarantee the necessary system integrity. In other words, dispatching with one radio altimeter failed may not be possible to guarantee the necessary safety margins.

We have found that instead of or in addition to using height information, speed stability can be realized when using a longitudinal control law when aircraft is set to approach configuration, i.e. when the flap lever is set to the landing position and landing gears are locked down. This means that a change in the speed can only be accomplished while force is applied in the longitudinal pilot inceptor. Under such circumstances, the effort of trimming the aircraft speed can be extremely reduced by the usage of a momentary on-off switch in the sidestick, instead of or in addition to a conventional trim up-down switch, making easier the task of airspeed selection by the pilot. This control law provides good handling qualities during approach and landing, with the benefit of not needing or using radio altimeter information in safety-critical applications.

In an exemplary illustrative non-limiting implementation, a control law based on load factor control is presented. For example, the flight control law computes the load factor command based on a set of flight parameters and on the sensed position of the pilot inceptor. The pilot inceptor may be any of a plurality of devices used in aeronautics industry to serve as an interface with a human pilot, e.g. columns, mini-columns, central sticks, control yokes, or side-sticks. The flight parameters include, but are not limited to, in this example, flaps position, calibrated airspeed and dynamic pressure.

The technology herein aims to propose a flight control system and a method of adding positive speed stability characteristics to a longitudinal control law when the aircraft is set to the approach configuration, i.e. when the flap lever is set to the landing position and landing gears are down, without requiring use of radio altimeter information. The effort of trimming the aircraft speed during approach can be extremely reduced by the usage of a momentary on-off switch in the sidestick.

The exemplary illustrative non-limiting technology described herein is a flight control system that adds positive static speed stability to longitudinal control law when aircraft is configured for landing, i.e. flap levers in the landing position and landing gears down-locked.

Since the illustrative reconfigured control law for landing no longer provides auto-trim capability, a manual trimming process is performed similarly to a conventional aircraft: the pilot will be required to keep the longitudinal inceptor in a pulled back position in order to reduce the aircraft speed.

Once the target speed is reached, the pilot can set this new speed reference value by pressing the momentary on-off switch located in the sidestick, which reduces significantly the pilot workload. As long as the momentary switch is pressed, the reference speed is continuously resynchronized to the current airspeed. When the switch is released, the current airspeed is latched as a new reference.

In order to avoid transients in the primary surface, a rate limiter is applied while the new reference speed is still not reached by the aircraft. The reference speed may be indicated in the primary flight display as a speed bug in the speed tape. The engagement of the landing mode is indicated as a flag also in the primary display.

A non-limiting advantage of the illustrative solution is a control law that provides suitable handling qualities during both approach and flare flight phases. Therefore, the radio altimeter is no longer needed as a trigger for the flare control law. This eliminates the failure case of using erroneous height information and allows the dispatch of the aircraft with one failed radio altimeter without reduction of safety margins.

In one example non-limiting implementation, no additional hardware or physical parts are needed to implement the proposed solution when compared to the aircraft in the basic configuration.

An example non-limiting illustrative system provides a flight control system mode and method that provides aircraft speed control through the usage of a momentary on-off switch in the pilot inceptor. When configured for landing, the engagement of the proposed mode adds positive static speed stability to a longitudinal control law that controls a load factor demand. Such an illustrative system can provide:

A way to the flight control system detects that the aircraft is configured for landing. The flap lever, landing gear position and weight on wheels sensors can for example be used to characterize the landing phase. However, any other sensor used in aeronautical industry could be used to detect the flight phase, for instance, but not limited to, airspeed, inertial data, radio altimeter, or a cockpit switch activated by the crew.

A way to the pilot to change the aircraft speed when positive speed stability is engaged. In one proposed solution, the pilot will be required to keep the longitudinal inceptor in a pulled back position in order to reduce the aircraft speed and in the forward position to increase speed. The pilot inceptor may be any of a plurality of devices used in aeronautics industry to serve as an interface with a human pilot, e.g. columns, mini-columns, central sticks, control yokes, or side-sticks.

A way for the pilot to select a new reference speed. When the target speed is reached a momentary on-off switch located in the pilot inceptor is pressed to select the current speed as the reference speed. This momentary switch may comprise any of a plurality of devices used in aeronautic industry such as switches, buttons, rotating buttons, levers, touchscreens, etc;

A mean of processing data and computing outputs, based on a determined logic, and commanding the elevator surfaces;

A mean of commanding the elevator surfaces according to the command given by this mean of processing data and computing outputs;

A set of sensors which senses the configuration of the flight vehicle and the state of flight, to be used in a logic module that decides if the flight control mode is to be engaged and put into operation.

Once engaged, a set of sensors which senses the configuration of the flight vehicle and the state of flight, is used in a logic module that decides if the flight control mode should disengage.

BRIEF DESCRIPTION OF THE DRAWINGS

These and other features and advantages will be better and more completely understood by referring to the following detailed description of exemplary non-limiting illustrative embodiments in conjunction with the drawings of which.

DETAILED DESCRIPTION

Figure 1:
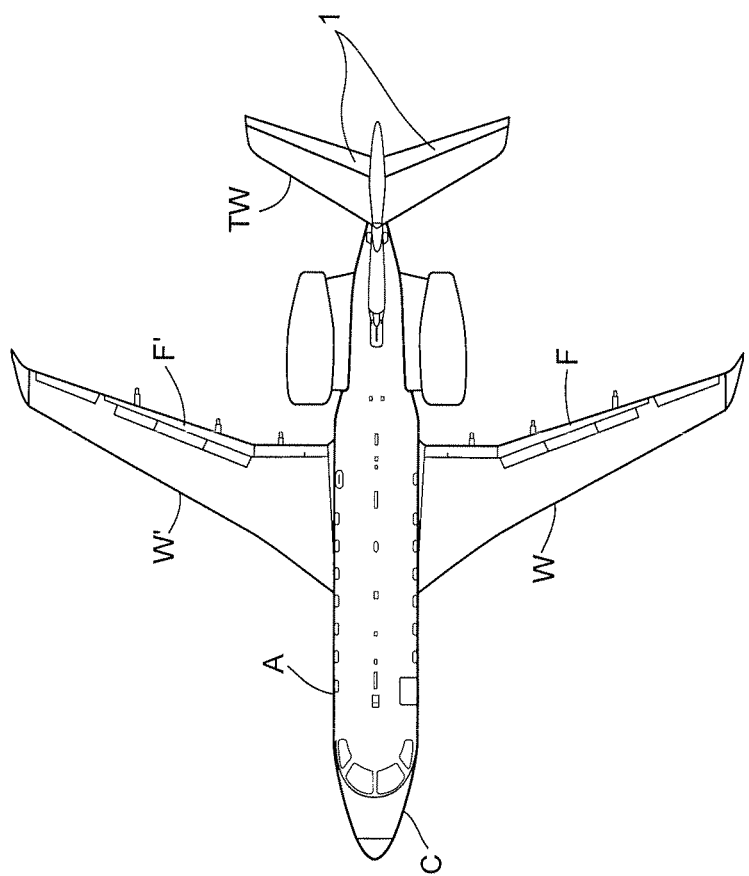
FIG. 1 is a non-limiting example of a flight vehicle such as a civil transporter turbo-fan.

FIG. 1 shows an example: a twin turbo-fan engines civilian transporter aircraft A. Two elevators (1) are installed in the horizontal tail wing TW for pitch control, and two flaps F are installed in the main wings W for controlling lift and to slow the aircraft during landing. The tail elevators 1 control the pitch of the aircraft A during takeoff, flight and landing. The pilot in the cockpit C interacts with the aircraft A to control the control surfaces including flaps F and elevators 1. A fly-by-wire electronic flight control system accepts pilot input (e.g., through manual manipulation of a flap lever 7 and a pilot interceptor 2, see FIG. 2), and uses automatic control laws typically implemented by a digital (computer) processing system to control actuators that in turn control the positions of flaps F and elevators 1. When landing, landing gear (not shown) on the aircraft A's underside descends from a compartment in the belly of the aircraft to provide wheels that contact the runway upon landing and permit the aircraft to roll down the runway.

Figure 2:
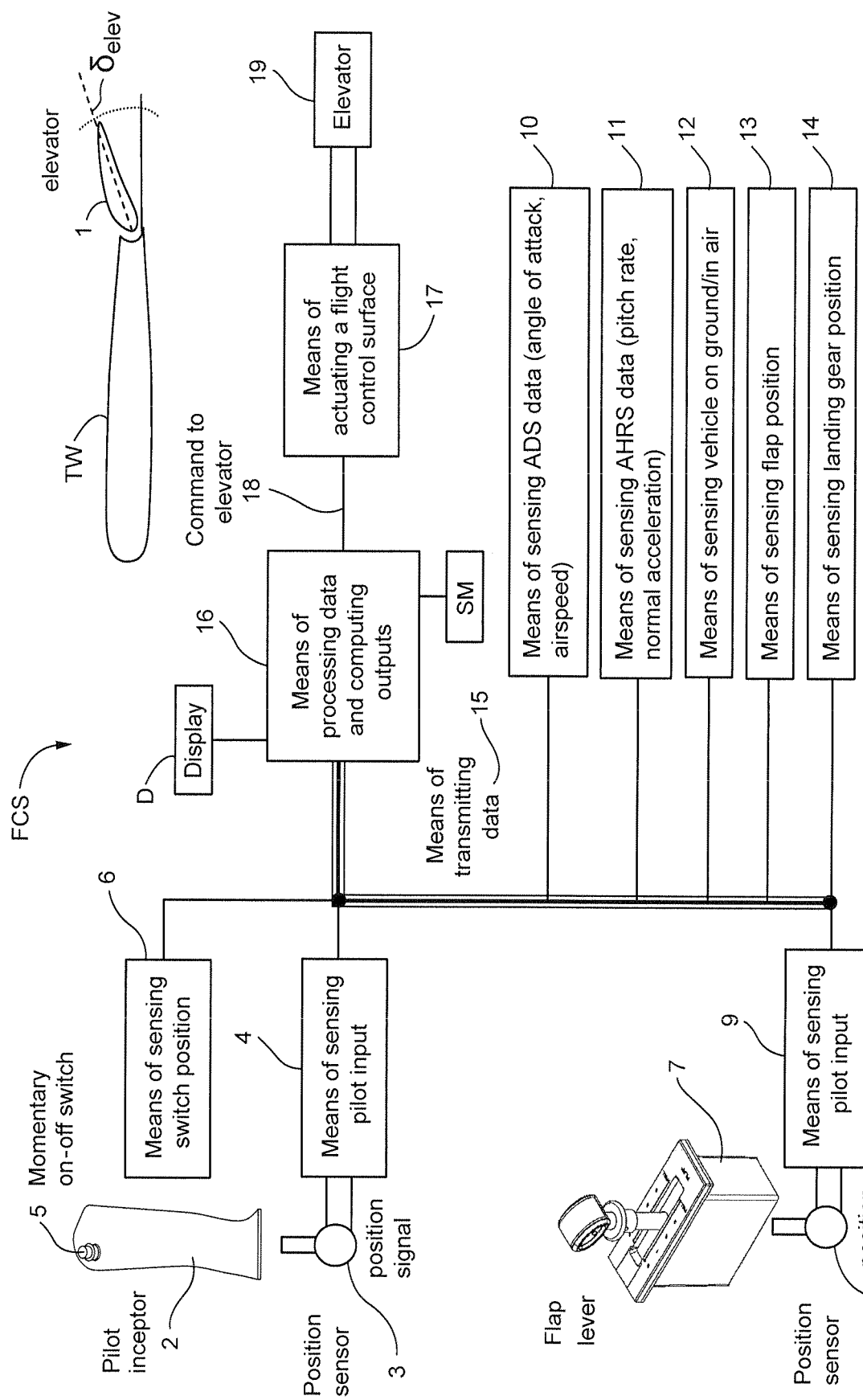
FIG. 2 is a schematic diagram of an exemplary illustrative non-limiting implementation of an example non-limiting flight control system, showing a basic non-limiting system architecture.

FIG. 2 shows an example non-limiting electronic flight control system FCS. The flight vehicle is equipped with a pilot flap lever (7) that the pilot can manually move to control the position of the flaps F (control surfaces on the main wing) e.g., to land the aircraft A. The present system is automatically engaged during landing operations when:

a) The flap lever position signal (8) is sensed (by means of sensing 9) and identified in the landing configuration, and b) the aircraft is identified as being in-air (by means of sensing 12), and c) the landing gears are down-locked (what is sensed by means of sensing 14).

After the engagement of this mode, the control law changes its characteristics of neutral static speed stability and auto-trim to a configuration with positive speed stability and manual trim.

In this configuration with positive speed stability, the trimming process is accomplished in a manner similar to a conventional aircraft. The system receives the longitudinal position inputs (3) (which is sensed by means of sensing 4) from the pilot inceptor (2). The pilot will be required to keep the longitudinal inceptor in a pulled back position in order to reduce the aircraft speed. In the opposite sense, if the pilot keeps the inceptor pushed forward, the aircraft speed is increased. The term pilot inceptor comprises a plurality of devices used in aeronautics industry to allow the interface with the human pilot, e.g. columns, mini-columns, sticks, side-sticks and all others.

Figure 6:
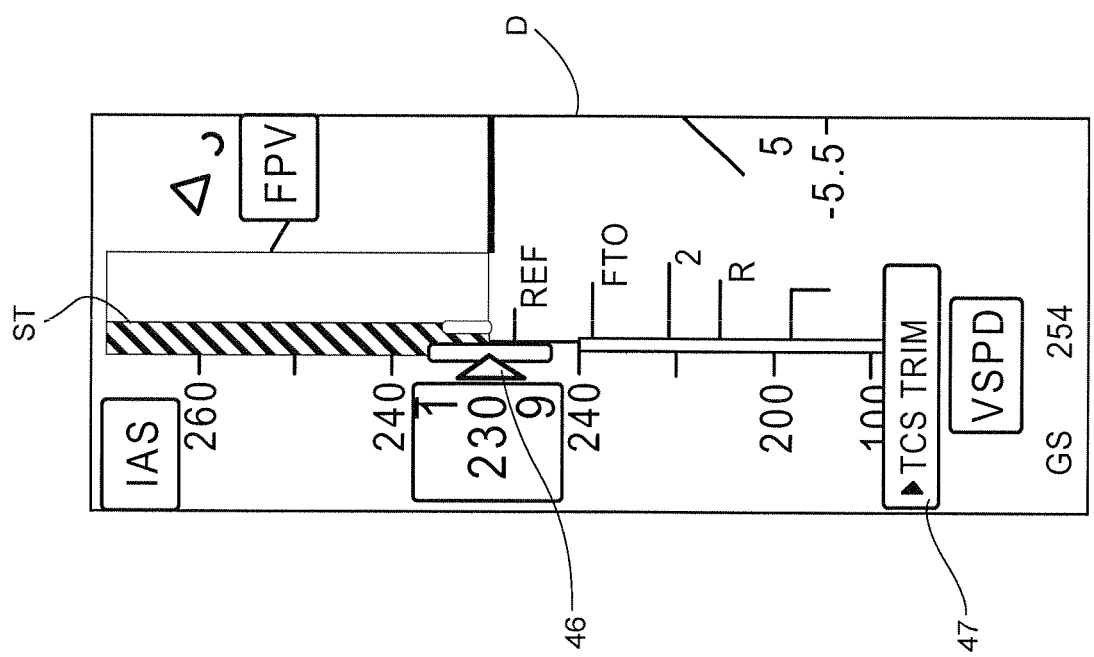
FIG. 6 presents example non-limiting primary flight display indications related to the exemplary illustrative non-limiting flight control system mode.

Once the target aircraft speed is reached, the pilot actuates the momentary ON-OFF switch (5) (located in the pilot inceptor 2) e.g., by pushing it with his thumb, and the information of the switch position (which is sensed by means of sensing 6) is used to select the current speed as the new reference speed. Reference speed can be set in this manner for example when the momentary on-off switch is depressed (to indicate that the pilot wishes to set the speed) and then released (i.e., when the pilot is satisfied that the current speed is the speed he wants to use as the speed setting). As shown in FIG. 6, the pilot can receive visual feedback via display D as a prompt to set speed trim using the momentary on-off control 5 and to indicate set speed using a speed bug 46 on a conventional speed tape ST. In the example illustration, when the pilot pushes and then releases momentary switch 5, the current speed is latched and used as a reference in the control law automatically applied by flight control system FCS. In one example non-limiting implementation, the current speed is latched the moment the pilot releases momentary on-off control 5.

The disclosed momentary on-off pilot switch 5 can comprise any of a plurality of devices used in aeronautic industry to permit the pilot turn ON or OFF a system, such as push buttons, levers, rotating buttons, voice commands, thought commands, and others. In one non-limiting example, the TCS (Touch Control Steering switch) button located in the pilot inceptor sidestick 2 can be used as the "momentary on-off switch", since this use is compatible with flight director synchronization usage given that the two functions are mutually exclusive (i.e., steering and landing descent are not performed simultaneously). Since the TCS button is already present for use by this other application, no extra weight is added to the aircraft and no additional controls are provided—the TCS switch is simply repurposed for a second use during the landing phase. However, any other or additional momentary on-off switch or other control located in the cockpit could be used instead.

The illustrative system receives signals from a set of sensors, namely: ADS—Air Data System—(10) that provides angle of attack and airspeed, AHRS—Attitude and Heading Reference System—(11) that provides pitch rate and normal acceleration, and the flap position (13). Other inputs can also be used.

In the example non-limiting implementation, the information flows via a means of transmitting data (15). All these data, i.e., from pilot commands, and aircraft sensors, are sent to a mean of processing data and computing outputs (16), based on a programmable code stored in a non-transitory storage medium SM. Processing arrangement 16 can comprise any conventional known processing system based e.g., on digital microprocessors and associated memory, peripherals and hardware interfaces. Then, processing arrangement (16) is able to compute an elevator command (18) based on the input data received. This command is sent to a mean of actuating a flight control surface (17), which comprises a control unit or actuator able to command the surfaces of the elevator (19) to the commanded position. Consequently, the elevator surfaces 1 are positioned according to the command computed by processing system (16). Processing system 16 is also able to provide information to the pilot and flight crew via one or more electronic displays D and/or other output devices such as audio speakers, buzzers, etc.

Figure 3:
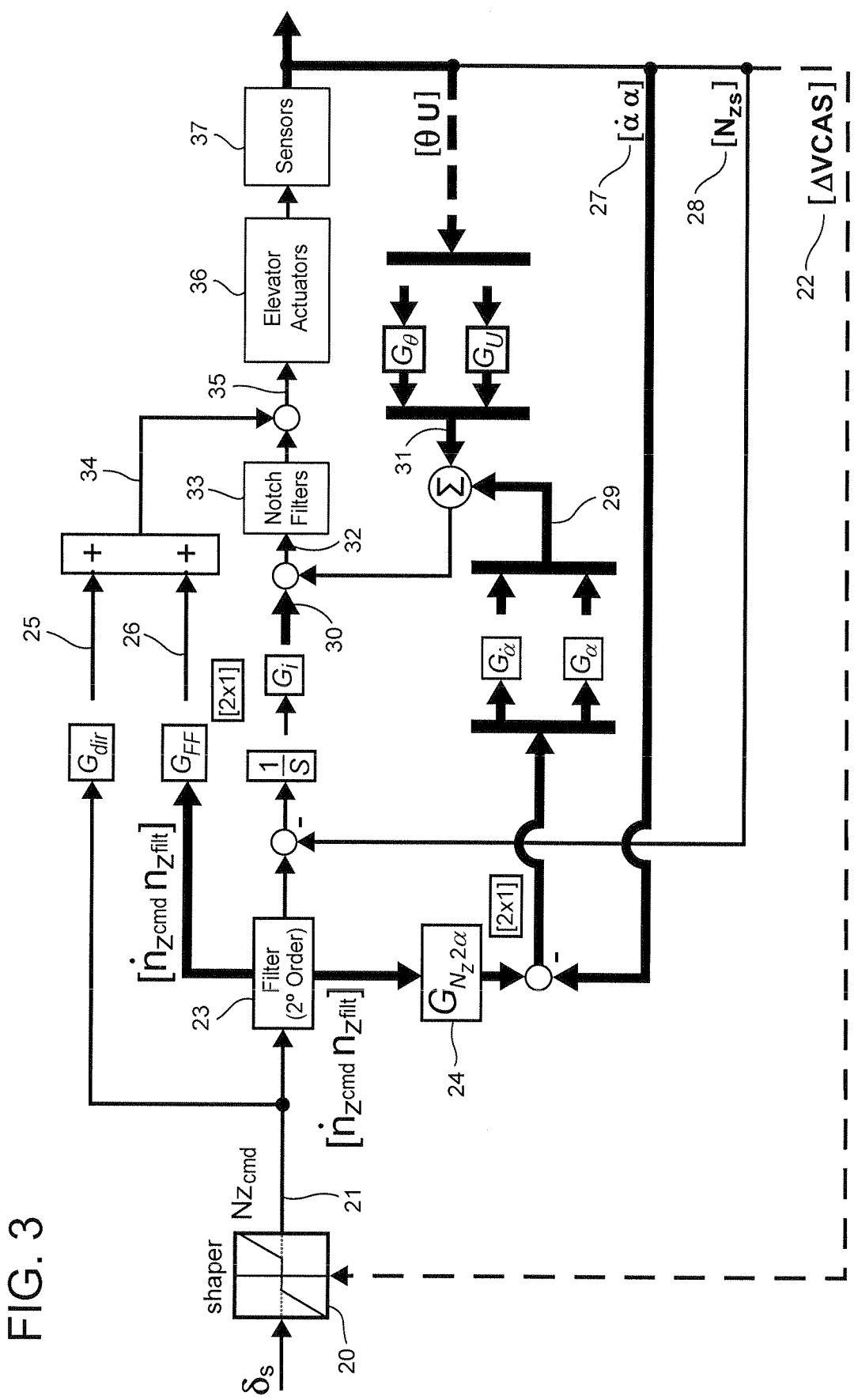
FIG. 3 presents a schematic of an example non-limiting architecture of the longitudinal control law based on load factor control with the speed path that provides positive static speed stability.

FIG. 3 details exemplary software program control instructions stored in non-transitory storage medium SM and executed by processing system (16), presenting a signal flow schematic. This way, the system comprises an "inceptor position to normal load factor command (Nzcmd) function" (20). The normal load factor command Nzcmd (21) is used as the set point of the closed loop control law.

A feed forward command (34) is calculated based on the summation of a two terms. The first term (25) is the normal load factor (Nzcmd) multiplied by a gain. In order to calculate the second term, the normal load factor (Nzcmd) is filtered through a second order filter (23). In this filtering process, the derivative of the load factor command $\dot{N}z_{cmd}$ is estimated and the filtered version of load factor command Nzfilt is calculated. These two signals ($\dot{N}z_{cmd}$,Nzfilt) are multiplied by gains to compose the second term (26). The resulting feed-forward command (34) is the summation of (25) and (26).

The filtered load factor command Nzfilt and the derivative of load factor command $\dot{N}z_{cmd}$ are also used to calculate the high-frequency path of the closed loop command. In the first step, reference of angle of attack and reference of the rate of angle of attack are created as a result of the multiplication of Nzfilt and $\dot{N}z_{cmd}$ by a conversion factor (24), respectively. These references are then subtracted from the real sensed value of angle of attack passed through a complementary filter ($\alpha$) and the estimated value of the derivative of angle of attack ($\dot{\alpha}$) (27), respectively. The results of these two subtractions are multiplied by two gains (G$\alpha$, G$\dot{\alpha}$), respectively, to generate the high-frequency path of the closed loop command (29).

The integral path of the closed loop command (30) is generated by the integral of the difference between the filtered load factor command Nzfilt and the sensed load factor converted to the stability axis (28) multiplied by a gain.

In order to provide positive static speed stability when the aircraft is configured for landing, two modifications are applied to the basic control law. The first modification is the calculation of an error $\Delta$VCAS (22) between the reference speed (selected by the pilot through the momentary on-off switch) and the sensed calibrated airspeed. This error is converted to a delta in the load factor command (20). The resulting Nzcmd (21) is then the original Nzcmd summed to the error generated by the difference between the reference speed and CAS (calibrated airspeed) converted to a delta load factor command.

The second modification is the calculation of low-frequency term (31) in the closed loop command of the control law. This term is the summation of sensed values of attitude angle ($\Theta$) and true airspeed (U) multiplied by individual gains.

The total closed loop command (32) is the summation of the integral term (30), the high-frequency term (29) and the low-frequency term (31). The total closed loop gain (the total closed loop command) is passed through a notch filter (33) to comply with structural stability requirements. The final elevator command (35) is the notch-filtered closed loop command summed with the feed forward command (34). The elevator command is sent to an electronic unit that controls the position of the elevator through electro-hydraulic actuators (36).

The effect of the new elevator position in aircraft dynamic response is sensed by specific sensors (37) to feedback the control system.

Figure 4:
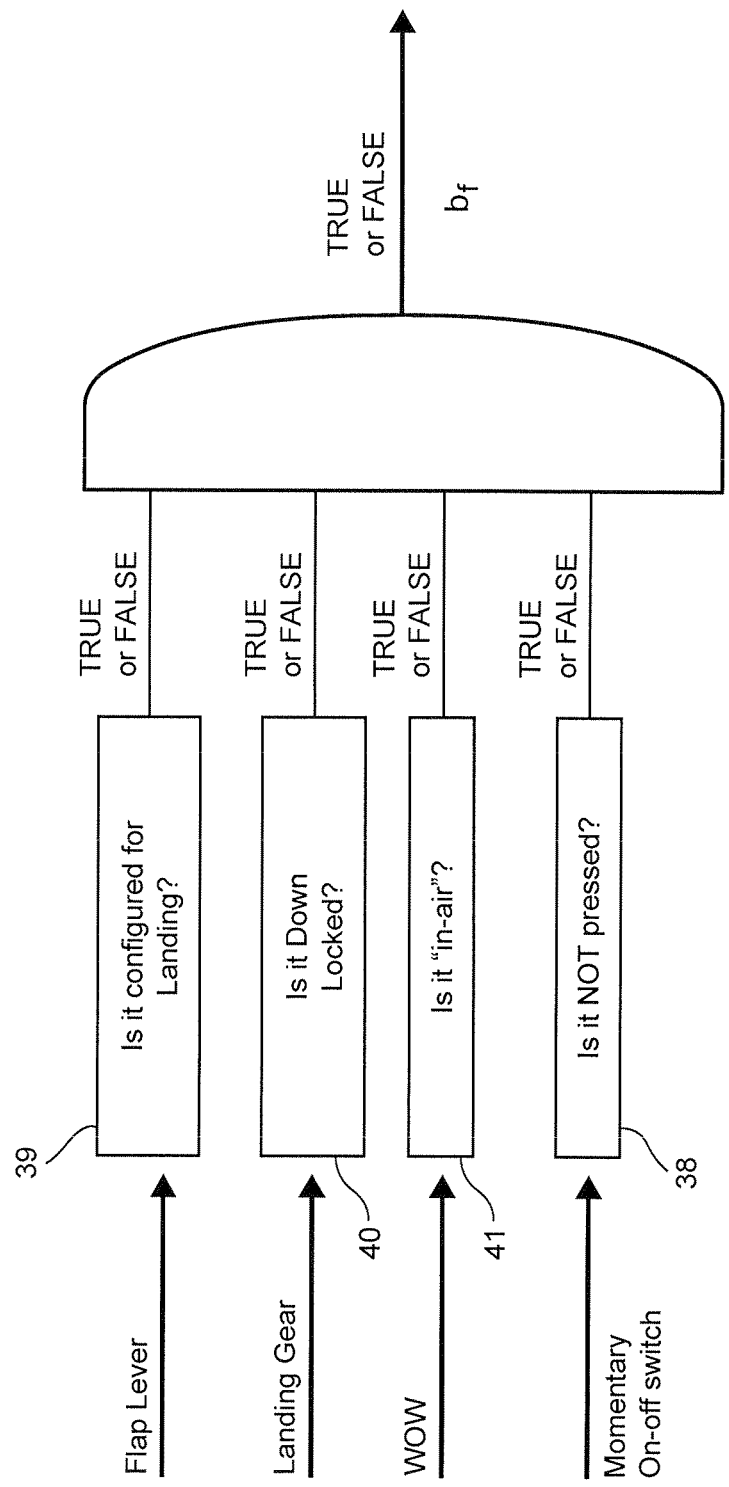
FIG. 4 is a diagram that details the exemplary illustrative non-limiting logic module, which enables the configuration of the control law with speed stability.

FIG. 4 describes example non-limiting logical conditions that need to be fulfilled in order to satisfy the interlock (bf=TRUE) that provides positive static speed stability to the longitudinal control law: Flap Lever configured for landing (39), landing gears down-locked (40) and aircraft indicating "in-air" status (WOW (weight on wheels)=FALSE) (41). In the non-limiting illustrative example, the momentary on-off switch located in the pilot inceptor also needs to be not pressed (38), in order to provide speed stability.

When the TCS or other momentary-on switch is pressed, the reference speed is synchronized to the current speed, which forces the delta in the load factor command (20) to zero. With the switch pressed, the default control law provides neutral static speed stability.

Figure 5:
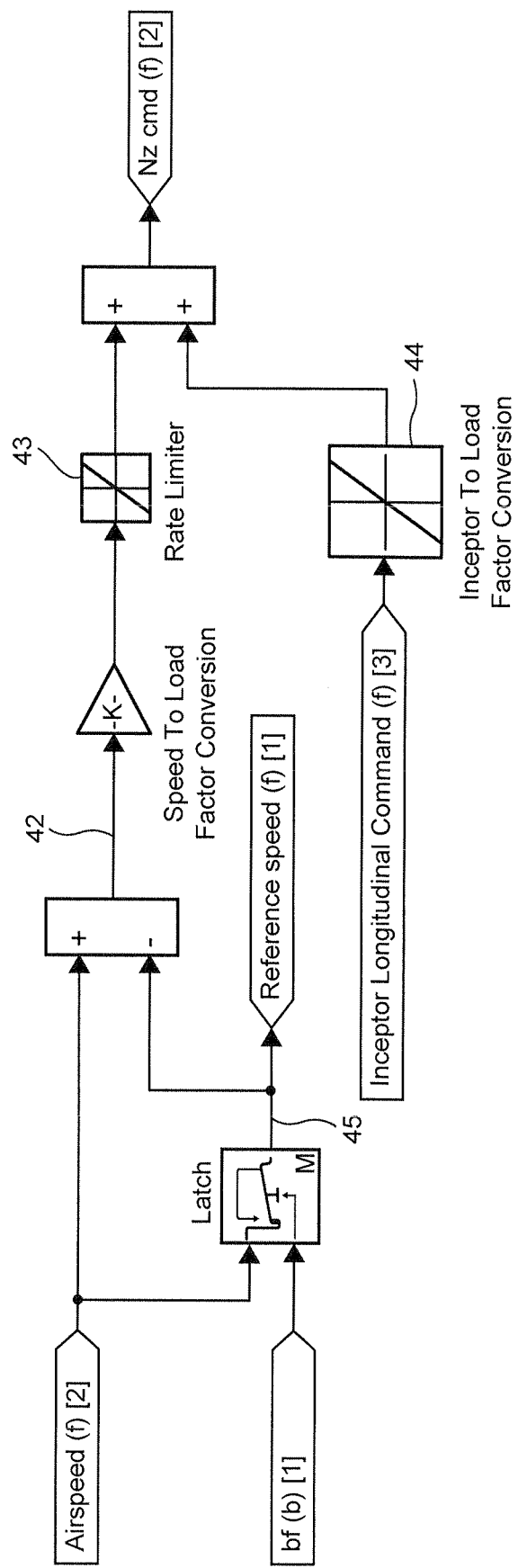
FIG. 5 pictorially describes with more example non-limiting details, how the speed stability is added to the control law, showing how the reference speed is set and how the delta speed is converted to a delta load factor command.

FIG. 5 provides details on the trimming process inside the control law algorithm when the momentary switch 5 is pressed. When the landing mode is engaged (bf=TRUE), the reference speed (45) is updated (latched) with the value of the current speed. If the pilot applies force in the longitudinal inceptor, the aircraft speed is changed and an error (42) is generated between the reference speed and the current aircraft speed. This speed error is converted to a load factor error through a conversion gain. When the momentary switch 5 is pressed (bf=FALSE) the reference speed is synchronized to the current airspeed. In other words, the speed error is instantaneously set to zero. In order to avoid an abrupt transient in the elevator surface when the momentary switch is pressed, a rate limiter is used (43).

Further, the final load factor command is the inceptor command converted to a demanded load factor calculated through a shaping function (44) summed to the delta load factor due to the error in between the reference speed and the current airspeed. The integral path of the control law (30) guarantees that the trimmed speed is reached with zero stead state error and sidestick at the neutral position.

FIG. 6 shows exemplary illustrative primary flight display indications. When the systems detects that the aircraft is configured for landing, the mode is indicated through the "TCS TRIM" flag (47) suggesting the usage of the TCS switch as the primary mean for trimming aircraft speed when this mode is engaged. The reference speed also is indicated in the conventional speed tape ST by speed bug (46).

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

We claim:

1. An aircraft flight control system for controlling an aircraft of the type having at least one elevator that controls aircraft pitch, the system comprising:
    an actuator operatively coupled to the elevator, the actuator being structured to operate the elevator in response to a control signal;
    a processing system coupled to the actuator and selectively generating the control signal; and
    a manually-manipulable momentary on-off control providing input to the processing system;
    the processing system being structured to operate the elevator actuator based on a longitudinal control law that controls a load factor demand, and to modify the longitudinal control law to set speed during approach and landing in response to said manually-manipulable momentary on-off control input.

2. The flight control system of claim 1 wherein the momentary on-off control comprises a momentary on-off switch in the pilot inceptor.

3. The flight control system of claim 1 wherein the processing system automatically determines when the aircraft is configured for landing and conditionally engages the speed-setting based on the momentary on-off control in response to the automatic landing determination.

4. The flight control system of claim 3 further including a flap lever and landing gear position and weight on wheels sensors, the processing system using said flap lever and sensors to characterize the landing phase.

5. The flight control system of claim 1 further including a manually-manipulable longitudinal inceptor, wherein the processing system is structured to allow a pilot to change the aircraft speed when positive speed stability is engaged by keeping the longitudinal inceptor in a pulled back position in order to reduce the aircraft speed and in the forward position to increase speed.

6. The flight control system of claim 1 wherein the processing system is structured so that the pilot selects a new reference speed during approach and landing by manually depressing and/or releasing the momentary on-off control, when a desired target speed is reached to select the current speed as the reference speed.

7. The flight control system of claim 1 wherein the processing system is structured to process data and compute outputs, based on a determined logic, and command the elevator actuator in response thereto.

8. The flight control system of claim 1 further including a set of sensors which senses the configuration of the aircraft and the state of flight, the processing system including a logic module that decides if a predetermined flight control mode responsive to the momentary on-off control is allowed to engage and operate.

9. The flight control system of claim 1 further including a set of sensors which senses the configuration of the flight vehicle and the state of flight, the processing system including a logic module that decides if a predetermined flight control mode responsive to the momentary on-off control should disengage.

10. On board an aircraft of the type including an aircraft flight control system for controlling at least one elevator that controls aircraft pitch at least during landing flare, a control method comprising:
    operating the elevator based on a longitudinal control law that controls a load factor demand; and
    selectively modifying the longitudinal control law to allow the pilot to set speed during approach and landing in response to manual operation by the pilot of a manually-manipulable momentary on-off control input when the airplane is in the landing phase.

11. The method of claim 10 wherein said manual operation comprises manually depressing and/or releasing a momentary on-off switch disposed on a pilot inceptor.

12. The method of claim 10 further including displaying set speed bug on a displayed speed tape.

13. The method of claim 10 further including determining when the airplane is in the landing phase in response to flap lever settings and landing gear sensors.

14. On board an aircraft of the type including an aircraft flight control system for controlling at least one elevator that controls aircraft pitch at least during landing flare, a non-transitory storage medium storing program control instructions that control the flight control system to:

operate the elevator based on a longitudinal control law that controls a load factor demand; and selectively modify the longitudinal control law to allow the pilot to set speed during approach and landing in response to manual operation by the pilot of a manually-manipulable momentary on-off control input when the airplane is in the landing phase.

15. The non-transitory storage medium of claim 14 wherein said stored program control instructions selectively modify the longitudinal control law in response to manual depression and/or release of a momentary on-off switch disposed on a pilot inceptor.

16. The non-transitory storage medium of claim 14 wherein the storage medium stores further control instructions that cause display of a set speed bug on a displayed speed tape.

17. The non-transitory storage medium of claim 14 wherein said stored program control instructions are further structured to determine when the airplane is in the landing phase in response to flap lever settings and landing gear sensors.

\* \* \* \* \*